United States Patent [19]

Kim

[11] Patent Number: 5,774,595
[45] Date of Patent: Jun. 30, 1998

[54] CONTOUR APPROXIMATION METHOD FOR REPRESENTING A CONTOUR OF AN OBJECT

[75] Inventor: Jin-Hun Kim, Seoul, Rep. of Korea

[73] Assignee: Daewoo Electronics Co., Ltd., Seoul, Rep. of Korea

[21] Appl. No.: 520,204

[22] Filed: Aug. 28, 1995

[30] Foreign Application Priority Data

Mar. 20, 1995 [KR] Rep. of Korea .................. 95-5871

[51] Int. Cl.$^6$ .............. G06K 9/36; G06K 9/48; G06K 9/46; G06K 9/40
[52] U.S. Cl. .......... 382/241; 382/199; 382/242; 382/250; 382/266; 348/384
[58] Field of Search ................. 382/241, 250, 382/266, 199, 242; 348/384

[56] References Cited

U.S. PATENT DOCUMENTS

| 4,748,675 | 5/1988 | Suzuki et al. | 382/241 |
| 5,054,103 | 10/1991 | Yasuda et al. | 382/250 |
| 5,510,838 | 4/1996 | Yomdin et al. | 348/384 |
| 5,644,654 | 7/1997 | Onokera | 382/199 |

*Primary Examiner*—Leo H. Boudreau
*Assistant Examiner*—Daniel G. Mariam
*Attorney, Agent, or Firm*—Anderson Kill & Olick, P.C.

[57] ABSTRACT

A contour approximation method accurately reconstructs a contour of an object by adding an extra vertex to the complex contour segment based on a curvature of the pixels on the contour image. The target pixel having the largest curvature as the extra vertex is selected.

12 Claims, 3 Drawing Sheets

CONTOUR APPROXIMATION METHOD FOR REPRESENTING A CONTOUR OF AN OBJECT

FIELD OF THE INVENTION

The present invention relates to a contour approximation method for use in a video signal encoder; and, more particularly, to an improved contour approximation method for accurately reconstructing a contour of an object.

DESCRIPTION OF THE PRIOR ART

In digital video systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video signal encoders as video-telephone and teleconference systems.

One of such methods for encoding video signals for a low bit-rate encoding system is the so-called object-oriented analysis-synthesis coding technique(see, Michael Hötter, "Object-Oriented Analysis-Synthesis Coding Based on Moving Two-Dimensional Objects", *Signal Processing: Image Communication*, 2, No.4, pp.409–428 (December, 1990)).

According to the object-oriented analysis-synthesis coding technique, an input video image is divided into objects and three sets of parameters for defining the motion, contour and pixel data of each object are processed through different encoding channels.

Specifically, in processing a contour image of an object, contour information is important for the analysis and synthesis of the object shape. The classical coding method for representing contour information is a chain coding technique. The chain coding method, however, requires a substantial amount of bits although there is no loss in the contour information.

In this regard, there have been proposed several methods to approximate a contour such as polygonal approximation and B-spline approximation. One of the disadvantages in the polygonal approximation is the rough representation of a contour image. The B-spline approximation is, on the other hand, capable of representing the contour image more precisely; however, it requires a high-order polynomial to reduce the approximation error, thereby, increasing the overall computational complexity of the video encoder.

One of the techniques introduced to ameliorate the problem of the overall computational complexity is a contour approximation employing a polygonal approximation and discrete sine transform(DST). This technique is described in a commonly owned copending application, U.S. Ser. No. 08/423,604, filed on Apr., 17, 1995 and entitled "A CONTOUR APPROXIMATION APPARATUS FOR REPRESENTING A CONTOUR OF AN OBJECT". However, when dealing with a complex contour image, the above technique employing the polygonal approximation and DST may yield a reconstructed image that is quite different from its original contour image.

SUMMARY OF THE INVENTION

It is, therefore, a primary object of the invention to provide an improved contour approximation method, for use in a video signal encoder, capable of reducing approximation errors in the encoded contour information.

In accordance with the invention, there is provided a contour approximation method, for use in a video signal encoder, for representing a contour image of an object, which comprises: (a) determining a number of vertices on the contour image; (b) fitting the contour image with a plurality of line segments to provide a polygonal approximation of the contour image, each of the line segments joining two neighboring vertices; (c) providing the position of the two vertices of a line segment as segment data; (d) determining a number of sample points for a line segment and providing sample point information representing the positions of the sample points, said sample points dividing each line segment into smaller segments of a uniform length; (e) calculating a first error at each of the sample points and the vertices on the line segment, the first error representing the distance between a line segment joining two vertices and the contour segment between the two vertices; (f) transforming the first errors for the sample points and the vertices into a set of discrete sine transform coefficients; (g) converting each set of discrete sine transform coefficients into a set of quantized transform coefficients; (h) converting the set of quantized transform coefficients into a set of reconstructed first errors; (i) providing a reconstructed contour segment based on the segment data, the sample point information and the set of first errors for each of the line segments; (j) calculating a second error which is the number of mismatched pixels between the reconstructed contour segment and its corresponding contour segment; (k) comparing the second error with a predetermined threshold value; (l) coding the set of quantized transform coefficients and the segment data of the contour segment, if the second error is smaller than said threshold value, or further segmenting the contour segment by adding an extra vertex on the contour segment into a pair of newly segmented contour segments and repeating the steps(c) to (l) with respect to a line segment which corresponds to each of the newly segmented contour-segments, if the second error is equal to or larger than the threshold value; and (m) repeating the steps(c) to (l) for all the line segments formed by the vertices determined at the step(a).

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
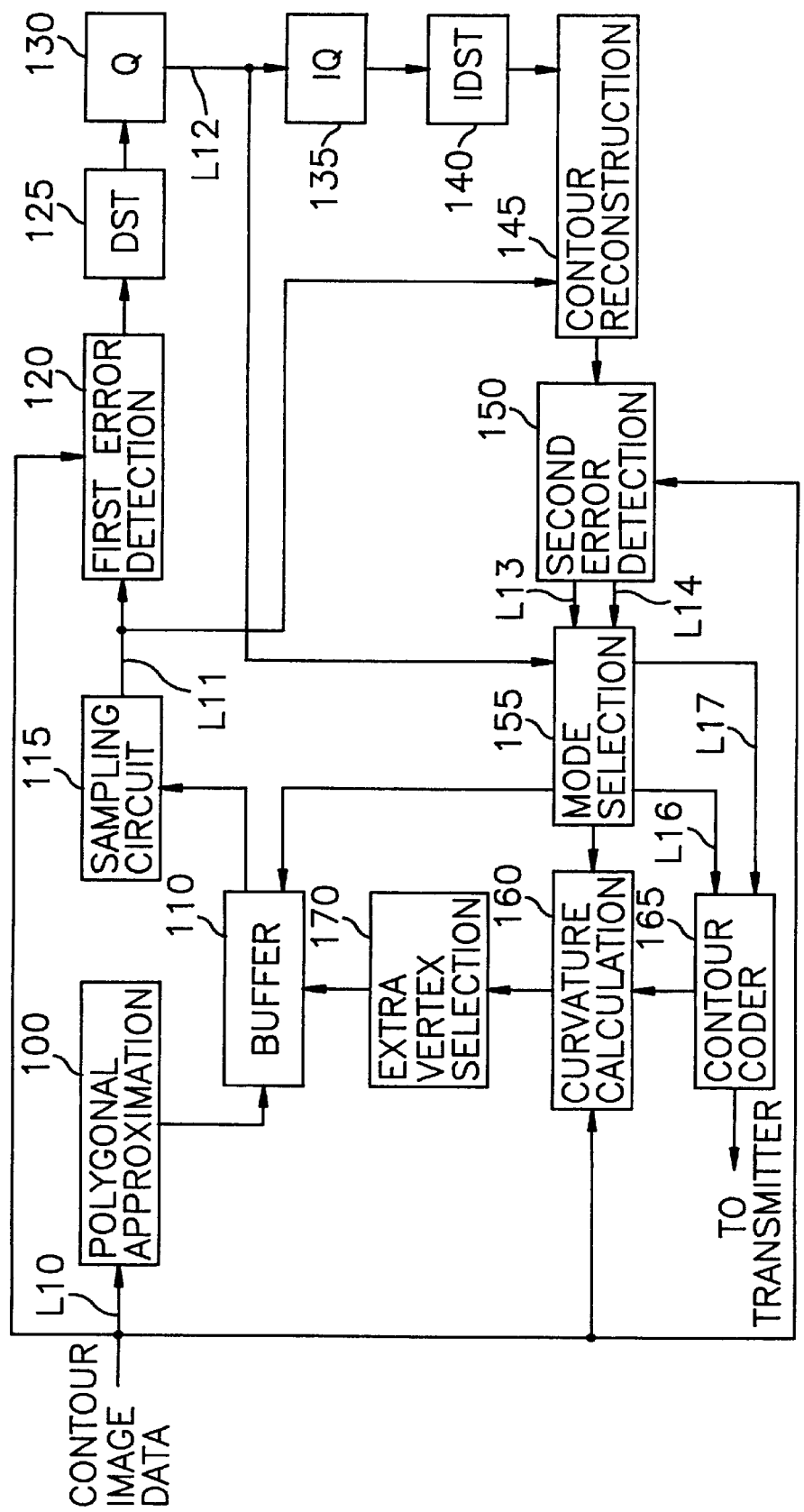
FIG. 1 depicts a block diagram of the inventive contour approximation apparatus for representing a contour image.

Referring to FIG. 1, there is shown a block diagram of the inventive contour approximation apparatus for representing a contour image of an object expressed in a video signal.

The contour image data representing the contour of an object is fed to a polygonal approximation block 100, a first and a second error detection blocks 120 and 150 and a curvature calculation block 160. At the polygonal approximation block 100, the contour image is approximated by a polygonal approximation technique. The polygonal approximation of the contour image is achieved through the use of a conventional approximation algorithm for fitting the contour image by line segments.

Figures 2A, 2B, 2C:
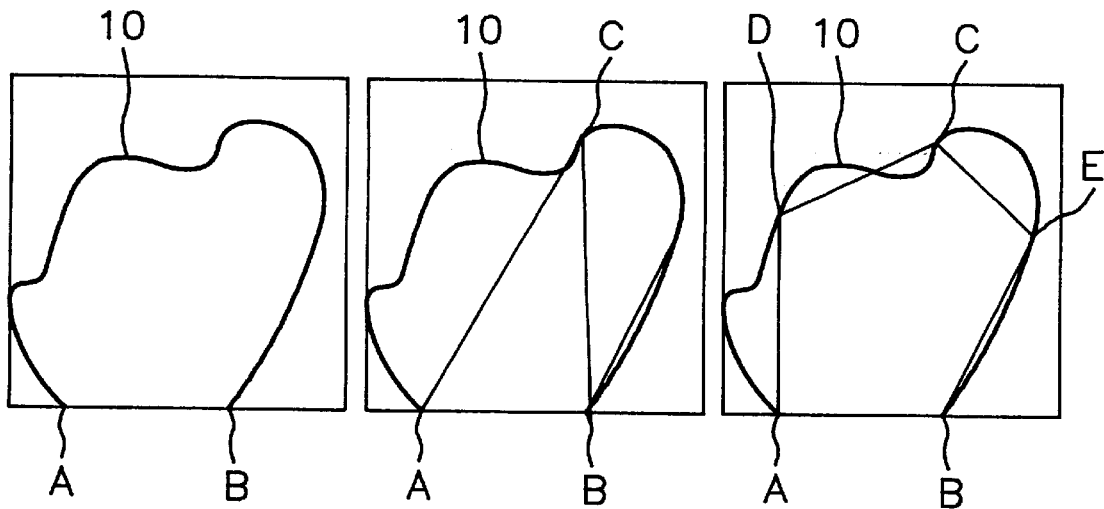
FIGS. 2A to 2C illustrate an exemplary polygonal approximation process of the contour image.

Referring to FIGS. 2A to 2C, there is illustrated a segmentation process for an exemplary contour image 10 according to the polygonal approximation technique.

First, two starting vertices are selected. If the contour image is of an open loop, two end points, e.g., A and B as shown in FIG. 2A, are selected as the starting vertices. On the other hand, if the contour image is in the form of a closed loop, two farthest points on the contour are selected as the starting vertices. And then, the farthest point on the contour from a line segment AB is determined. If the distance $D_{max}$ between the line segment AB and the farthest point, e.g., C, is greater than a predetermined threshold value, the point C becomes a vertex. This procedure is repeated, as shown in FIG. 2C, until $D_{max}$ for each segment becomes smaller than the predetermined threshold value TH1.

The number of vertices for a given contour depends on the predetermined threshold value TH1. As can be seen from FIG. 2C, the representation of the contour image by line segments becomes more accurate with a smaller predetermined threshold value at the expense of coding efficiency.

Referring back to FIG. 1, vertex information representing the positions of the determined vertices, e.g., A, B, C, D and E, of the contour image 10, as shown in FIG. 2C, is provided from the polygonal approximation block 100 to a buffer 110.

The buffer 110 receives the vertex information from the polygonal approximation block 100 and stores this information as vertex data. After the vertex information for all the vertices determined at the polygonal approximation block 100 is stored at the buffer 110, the contour approximation of the present inventive process is initiated, e.g., by a process controller(not shown), starting from, e.g., a segment AD shown in FIG. 2C. That is, in response to an initiation signal from the process controller, the buffer 110 provides segment data representing the positions of the two vertices of the line segment, e.g., AD to a sampling circuit 115.

The sampling circuit 115 determines a predetermined number, e.g., 4, of sample points for each line segment, wherein the sample points divide the line segments into sub-segments of a uniform length, and provides the segment data and sample point information, which represents the positions of the determined sample points, to the first error detection block 120 and a contour reconstruction block 145 via a line L11.

Based on the segment data and the sample point information from the sampling circuit 115 and the contour image data on the line L10, the first error detection block 120 calculates a first error at each of the sample points and the vertices on the line segment. The first error represents the distance between a line segment joining two vertices and the contour segment between the two vertices.

Figure 3A:
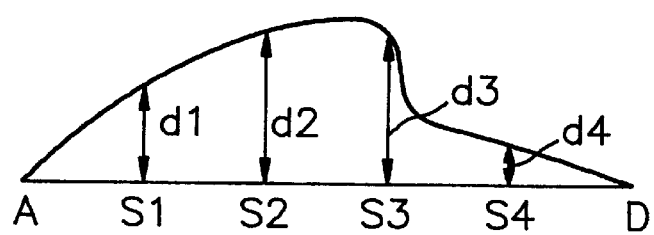
FIGS. 3A and 3B show exemplary diagrams, each of which representing errors between a line segment joining two vertices and its corresponding contour image.
Figure 3B:
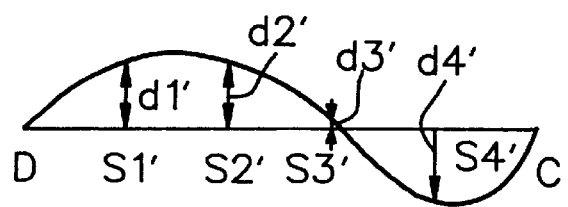

FIGS. 3A and 3B illustrate exemplary diagrams representing the first errors between line segments and corresponding contour segments, wherein FIG. 3A depicts the first error between the line segment AD and its corresponding contour segment and FIG. 3B shows the first error between the line segment DC and its corresponding contour segment. Each of the errors d1 to d4 or d1' to d4' represents the distance from each sample point s1 to s4 on the line segment AD or s1' to s4' on the line segment DC to the corresponding contour segment. As can be seen in FIGS. 3A and 3B, the approximation errors for the vertices are all "zeros". For all the vertices are positioned on the contour.

The first errors calculated by the first error detection block 120 are supplied to a discrete sine transform(DST) block 125. The DST block 125 performs one-dimensional DST operation on a set of the first errors for the line segment to produce a set of DST coefficients. The set of DST coefficients is provided to a quantization(Q) block 130. The quantization block 130 quantizes the set of DST coefficients to provide on a line L12 a set of quantized DST coefficients corresponding to the line segment to an inverse quantization (IQ) block 135 and a mode selection block 155 for further processing.

At the inverse quantization block 135, the set of quantized DST coefficients is converted back into a set of reconstructed DST coefficients. The set of reconstructed DST coefficients is then inverse-transformed into a set of reconstructed first errors at an inverse DST block 140. Thereafter, the set of reconstructed first errors is provided to the contour reconstruction block 145.

Based on the set of reconstructed first errors from the IDST block 140 and the segment data and the sample point information from the sampling circuit 115, the contour reconstruction block 145 generates a reconstructed contour segment and provides the reconstructed contour segment data to the second error detection block 150.

Figure 4A:
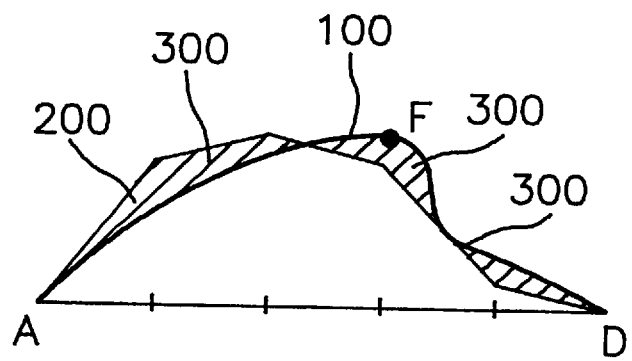
FIG. 4A to 4C exemplify the extra vertex adding operation in accordance with the present invention.

The second error detection block 150 calculates a second error which is the number of mismatched pixels between the reconstructed contour segment from the contour reconstruction block 145 and its corresponding original contour segment provided from the contour image data on the line L10 and provides the second error on a line L13 and the segment data, i.e., the position data for the two vertices of the reconstructed contour segment, on a line L14. Referring to FIG. 4A, there are depicted the original contour segment 100 and an exemplary reconstructed contour segment 200 for the line segment AD. In this case, the second error corresponds to the number of pixels included in a region 300 which is enclosed by the contour segments 100 and 200.

At the mode selection block 155, the second error is compared with a preset threshold value TH2. If the second error is smaller than the preset threshold value TH2, the mode selection block 155 provides the set of quantized DST coefficients from the quantization block 130 and the segment data of the corresponding contour segment from the second error detection block 150 to a contour coder 165 via lines L16 and L17, respectively; also provides a first enable signal to the buffer 110. In such a case, segment data for a pair of vertices, e.g., D and C, of a next segment to be processed is provided from the buffer 110 to the sampling circuit 115; and the above process is repeated until all the segments of the contour image are processed as long as the second error of a segment is smaller than the present threshold value TH2.

On the other hand, if a second error for a reconstructed contour segment is equal to or larger than the threshold value TH2, the original contour segment corresponding to each reconstructed contour segment is further segmented by adding an extra vertex thereon in accordance with the present invention. That is, if the second error for a reconstructed contour segment is equal to or greater than the threshold value TH2, the mode selection block 155 provides the segment data for the vertices thereof and a second enable signal to the curvature calculation block 160 and the buffer 110, respectively. At the curvature calculation block 160, a curvature is calculated for each of the selected pixels on the original contour segment corresponding to the segment data from the mode selection block 155.

Figure 5:
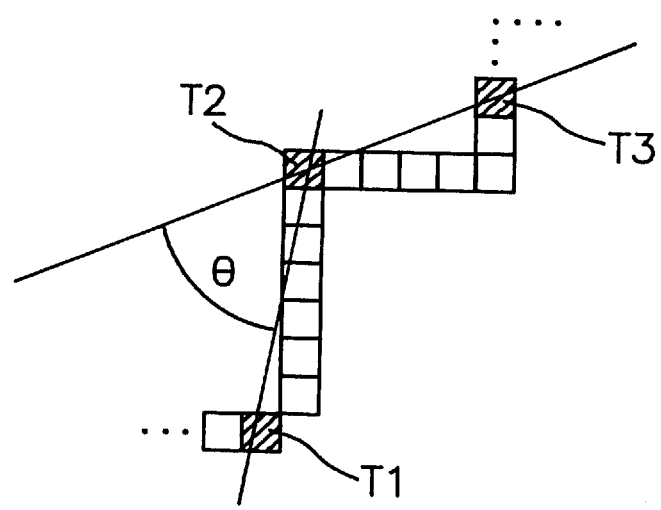
FIG. 5 describes the curvature calculation scheme in accordance with the present invention.

Referring to FIG. 5, there is shown an explanatory diagram depicting the curvature calculation process carried out at the curvature calculation block 160 in accordance with the present invention. First, as shown in FIG. 5, every Nth, e.g., 6th, pixel on the contour segment is selected as a target pixel, e.g., T1, T2 or T3. Then, a line is drawn through each pair of two neighboring target pixels, e.g., T1 and T2. An angle change made by the two lines that pass through a certain target pixel is determined as the curvature for that target pixel. Thereafter, the curvature calculation block 160 provides target pixel information representing the position and curvature for each target pixel to an extra vertex selection block 170.

Figure 4B:
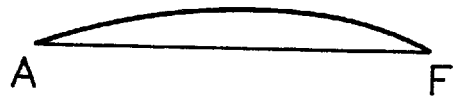
Figure 4C:

The extra vertex selection block 170 compares the curvatures for the target pixels from the curvature calculation block 160 to select therefrom a target pixel, e.g., F shown in FIG. 4A, having the largest curvature as the extra vertex and provides the extra vertex information representing the position of the extra vertex to the buffer 110. The extra vertex information is stored as the vertex data in the buffer 110. Therefore, a complex contour segment having a large mismatch, e.g., contour segment 100 shown in FIG. 4A, is divided into two less complex contour segments, which can be approximated more precisely by DST, as shown in FIG. 4B and FIG. 4C by adding, e.g., an extra vertex F between the two vertices, e.g., A and D.

Then, in response to the second enable signal, the buffer 110 provides segment data for the vertices A and F to the sampling circuit 115; and the above described contour approximation process is repeated for the segment AF.

In the meantime, at the contour coder 165, each set of the quantized DST coefficients on the line L16 is encoded by using, e.g., the binary arithmetic code of JPEG(Joint Photographic Experts Group), while the segment data on the line L17 is encoded by using, e.g., a fixed length code without compression since the vertices are sparsely correlated. The encoded digital signal comprising the encoded quantized DST coefficients and the segment data is transmitted to a transmitter for the transmission thereof.

While the present invention has been described with respect to the particular embodiments, it will be apparent to those skilled in the art that various changes and modifications may be made without departing from the scope of the invention as defined in the following claim.

What is claimed is:

1. A contour approximation method, for use in a video signal encoder, for representing a contour image of an object, which comprises the steps of:

(a) determining a number of vertices on the contour image;

(b) fitting the contour image with a plurality of line segments to provide a polygonal approximation of the contour image, each of the line segments joining two neighboring vertices;

(c) providing the positions of the two vertices of a line segment as segment data;

(d) determining a predetermined number of sample points for the line segment and providing sample point information representing the positions of the sample points, said sample points dividing the line segment into smaller segments of a uniform length;

(e) calculating a first error at each of the sample points on the line segment to obtain first errors, each of the first errors representing the distance between the line segment joining two vertices and a contour segment between the two vertices at corresponding sample points;

(f) transforming the first errors at the sample points into a set of discrete sine transform coefficients;

(g) converting the set of discrete sine transform coefficients into a set of quantized transform coefficients;

(h) converting the set of quantized transform coefficients into a set of reconstructed first errors;

(i) generating a reconstructed contour segment based on the segment data, the sample point information and the set of first errors for each of the line segments;

(j) calculating a second error representing the number of mismatched pixels between the reconstructed contour segment and its corresponding contour segment;

(k) comparing the second error to a predetermined threshold value;

(l) coding the set of quantized transform coefficients and the segment data of the contour segment if the second error is determined to be smaller than said threshold value;

(m) segmenting the contour segment further into a pair of newly segmented contour segments by adding an extra vertex on the contour segment and repeating the steps (c) to (k) for each of said pair of the newly segmented contour segments using a corresponding line segment if the second error is determined to be equal to or larger than said threshold value; and (n) repeating the steps (c) to (m) for each of said plurality of line segments formed by the vertices determined at the step (a).

2. The contour approximation method as recited in claim 1, wherein the step of segmenting includes the steps of:

selecting every Nth pixel on the contour segment as a target pixel and drawing a line through each pair of two neighboring target pixels such that each target pixel is connected to two neighboring pixels by two separate lines if the second error is determined to be equal to or larger then said threshold value, wherein N is a positive integer;

determining a curvature at each target pixel wherein the curvature represents an angle change made by the two lines at said each target pixel; and selecting a target pixel having the largest curvature as the extra vertex.

3. The contour approximation method as recited in claim 2, wherein N is 6.

4. A contour approximation method, for use in a video signal encoder, for representing a contour image of an object, which comprises the steps of:

(a) fitting the contour image with a plurality of line segments to provide a polygonal approximation of the contour image, each of the line segments joining two neighboring vertices;

(b) providing the positions of the two vertices of a line segment as segment data;

(c) determining a predetermined number of sample points for the line segment and providing sample point information representing the positions of the sample points, said sample points dividing each line segment into smaller segments of a uniform length;

(d) calculating a first error at each of the sample points on the line segment to obtain first errors, each of the first errors representing the distance between the line segment joining two vertices and a contour segment between the two vertices at corresponding sample points;

(e) converting the first errors at the sample points into a set of quantized transform coefficients;

(f) converting the set of quantized transform coefficients into a set of reconstructed first errors;

(g) generating a reconstructed contour segment based on the set of reconstructed first errors, the sample point information and the segment data;

(h) calculating a second error representing the number of mismatched pixels between the reconstructed contour segment and its corresponding contour segment;

(i) comparing the second error to a predetermined threshold value;

(j) coding the set of quantized transform coefficients and the segment data of the contour segment if the second error is determined to be smaller than said threshold value; or (k) segmenting the contour segment further into a pair of newly segmented contour segments by adding an extra vertex on the contour segment and repeating the steps (c) to (i) for each of said pair of the newly segmented contour segments using a corresponding line segment if the second error is equal to or larger than said threshold value; and (l) repeating the steps (c) to (k) for each of said plurality of line segments formed by the vertices determined at the step (a).

5. The contour approximation method as recited in claim 4, wherein the step of segmenting includes the steps of:

selecting every Nth pixel on the contour segment as a target pixel and drawing a line through each pair of two neighboring target pixels such that each target pixel is connected to two neighboring pixels by two separate lines if the second error is determined to be equal to or larger then said threshold value, wherein N is a positive integer;

determining a curvature at each target pixel wherein the curvature represents an angle change made by the two lines at said each target pixel; and selecting a target pixel having the largest curvature as the extra vertex.

6. The contour approximation method as recited in claim 5, where in the step (e) employs a discrete sine transform method and a quantization method.

7. The contour approximation method as recited in claim 6, wherein the predetermined number of sample points is 4 and N is 6.

8. A contour approximation apparatus, for use in a video signal encoder, for representing a contour image of an object, which comprises:

polygonal approximation means for fitting the contour image with a plurality of line segments to provide a polygonal approximation of the contour image, each of the line segments joining two neighboring vertices;

means for providing the positions of the two vertices of a line segment as segment data;

sampling means for determining a predetermined number of sample points for the line segment and providing sample point information representing the positions of the sample points, said sample points dividing the line segment into smaller segments of a uniform length;

first error generation means for generating a first error at each of the sample points on the line segment to obtain first errors, each of the first errors representing the distance between the line segment joining two vertices and the contour segment between the two vertices at corresponding sample points;

first conversion means for converting the first errors at the sample points into a set of quantized transform coefficients;

second conversion means for converting the set of quantized transform coefficients into a set of reconstructed first errors;

second error generation means for generating a second error representing the number of mismatched pixels between the reconstructed contour segment and its corresponding contour segment;

means for comparing the second error to a predetermined threshold value to generate a first and second control signals based on the comparison result, wherein the first control signal is generated if the second error is determined to be smaller than the predetermined threshold value, and the second control signal is generated if the second error is determined to be equal to or larger than the predetermined threshold value;

coding means for coding the segment data and its corresponding set of quantized transform coefficients in response to the first control signal; and extra vertex generation means, in response to the second control signal, for further segmenting the contour segment into a pair of newly segmented line segments by adding an extra vertex on the contour segment, wherein each of the newly segmented line segments is supplied as the line segment to the means for providing.

9. The contour approximation apparatus as recited in claim 8, wherein the extra vertex generation means includes:

means for selecting every Nth pixel on the contour segment as a target pixel and drawing a line through each pair of two neighboring target pixels such that each target pixel is connected to two neighboring pixels by two separate lines if the second error is determined to be equal to or larger then said threshold value, wherein N is a positive integer;

means for determining a curvature at each target pixel wherein the curvature represents an angle change made by the two lines at each target pixel; and means for selecting a target pixel having the largest curvature as the extra vertex.

10. The contour approximation apparatus as recited in claim 9, wherein the first conversion means includes a discrete sine transformer and a quantizer.

11. The contour approximation apparatus as recited in claim 10, wherein the predetermined number of sample points is 4 and N is 6.

12. The contour approximation apparatus as recited in claim 11, wherein the second conversion means includes an inverse quantizer and an inverse discrete sine transformer.

* * * * *